US005583695A

United States Patent [19]

Dobrusskin

[11] Patent Number: 5,583,695

[45] Date of Patent: Dec. 10, 1996

[54] APPARATUS INCLUDING DIRECTIDAL SELECTIVE SCREENING MEANS FOR DISPLAYING AN IMAGE OF AN OBJECT

[75] Inventor: Christoph Dobrusskin, Hayes, England

[73] Assignee: Central Research Laboratories Limited, Middlesex, England

[21] Appl. No.: 384,507

[22] Filed: Feb. 1, 1995

[30] Foreign Application Priority Data

Mar. 5, 1994 [GB] United Kingdom .................. 9404258

[51] Int. Cl.[6] .................................................. G02B 27/14

[52] U.S. Cl. ........................................ 359/633; 359/630

[58] Field of Search ................................ 359/633, 850, 359/630

[56] References Cited

U.S. PATENT DOCUMENTS

| | | | |
|---|---|---|---|
| 4,168,912 | 9/1979 | Kempf | 356/394 |
| 4,200,366 | 4/1980 | Freeman | 353/78 |
| 4,506,837 | 4/1985 | Kassies | 353/10 |
| 5,084,628 | 1/1992 | Burge | 250/571 |
| 5,182,452 | 2/1993 | Hodson | 353/94 |
| 5,420,718 | 5/1995 | Davies | 359/448 |

*Primary Examiner*—Georgia Y. Epps
*Assistant Examiner*—Ricky Mack
*Attorney, Agent, or Firm*—Keck, Mahin & Cate

[57] ABSTRACT

An apparatus for displaying an image of an object comprises a beam splitter and retroreflectors between the object and the beam splitter on opposite sides of the object. Louvre films adjacent the beam splitter having oppositely directed slats allow observers on opposite sides of the apparatus to view the image but not the object.

5 Claims, 3 Drawing Sheets

APPARATUS INCLUDING DIRECTIDAL SELECTIVE SCREENING MEANS FOR DISPLAYING AN IMAGE OF AN OBJECT

BACKGROUND OF THE INVENTION

1. Field of the Invention

This invention relates to an apparatus for displaying an image comprising a beam splitter for receiving light from an object situated on one side thereof and reflecting at least part of that light in first and second directions and retroreflector means for receiving the light reflected in said first and second directions and reflecting at least part of that light back to the beam-splitter to be transmitted thereby and form an image of the object on the other side of the beam splitter.

2. Cross-References to Related Applications

Our copending application No. PCT/GB 94/02611 discloses such an apparatus wherein light from the object is reflected by the beam splitter in first (20), second (21) and third (22) directions which together encompass an angle of more than 180° around the object and which is characterized in that the retroreflector means does not lie between the object and the beam splitter as shown in FIG. 4.

SUMMARY OF THE INVENTION

The present invention relates to an improvement in the apparatus defined in the first paragraph, which is characterized by screening means between the retroreflector means and the image having first and second portions which transmit light reflected by the retroreflector means in the first and second directions respectively and which screen light reflected in the other of the directions and light directly from the object.

Thus, observers who can see the suspended image from different directions cannot see the object itself.

The apparatus may include shutter means for selectively preventing the passage of light from a part of the retroreflector means to the observer. In this case the view of one observer of the suspended image may be blocked whilst the view of another observer is not blocked.

Alternatively, the apparatus may include means for selectively altering the polarization of light from the object, the beam splitter having two parts being polarization selective in opposite senses.

In another alternative, there may be at least two filter means each allowing the passage therethrough of light having different given spectral characteristics, the filter means each being positioned between a different part of the retroreflector means and the image.

BRIEF DESCRIPTION OF THE DRAWINGS

In order that the invent ion may be more readily understood, reference will now be made, by way of example, to the accompanying schematic drawings in which.

DESCRIPTION OF THE PREFERRED EMBODIMENTS

Figure 1:
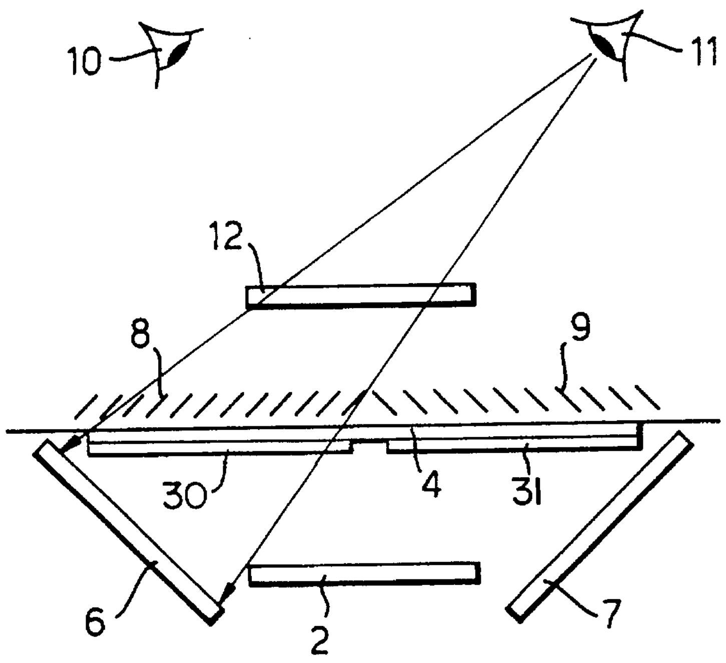
FIG. 1 is a cross-sectional side view of one embodiment of the invention.

Referring to FIG. 1, an object 2 to be displayed is positioned on one side of a beam splitter 4. The object in this example is a substantially flat screen such as the screen of a cathode ray tube which is parallel to the beam splitter. Retroreflector means, comprising for example a pair of opposed retroreflectors 6,7 which may be flat, are positioned in a path for light from the object which has been reflected by the beam splitter 4 in first and second directions respectively. In this example the retroreflectors 6, 7 are at an angle of about 45° to the object and the beam splitter and extend between the beam splitter and the edge of the object. The apparatus described thus far is similar to that shown in FIG. 1 of our copending application. According to this invention, the apparatus additionally includes screening means 8, 9 which in this example comprises a pair of louvre screens having oppositely directed slats placed adjacent the beam splitter.

It can be seen that the louvre slats are angled such that direct light from the object 2 is prevented from passing through the beam splitter 4 to an observer, but light reflected by the beam splitter to the retroreflector 6 or 7 may pass through the louvre 8 or 9 respectively.

Thus observers 10, 11 on opposite sides of the apparatus cannot see the object 2 directly, but can each see an image 12 thereof suspended on the other side of the beam splitter 4.

In some applications of the invention the facility may be required for blocking off the image from one observer or the other. Such an application might include a computerized card game or a game such as 'battleships'.

Figure 2:
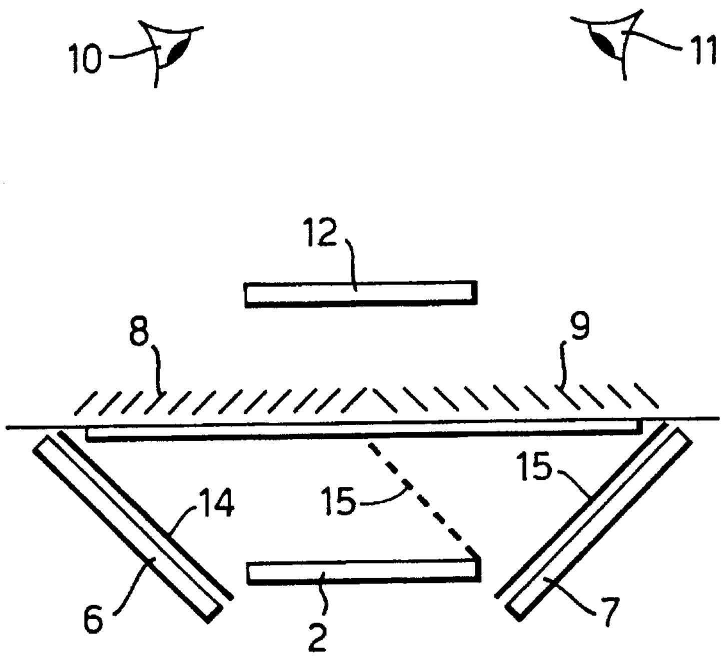
FIGS. 2 and 3 are a cross-sectional side views of alternative embodiments of the invention.

Referring to FIG. 2 this is achieved by shutter means comprising shutters 14, 15 each for selectively preventing the passage of light from its corresponding retroreflector 6 or 7 respectively through the beam splitter 4 to the corresponding observer 11 or 10 respectively. In the case of one 15 of the shutters, the drawing shows alternative positions therefor.

The shutters 14, 15 comprise a material which can be made transparent or opaque as required; for example they may comprise polymer dispersed liquid crystal (PDLC) material. If the object, for example a display on a display screen, alternates between the images intended for the respective observers, with the shutters operating synchronously therewith, it can be arranged that each observer sees a different continuous image, which may be a static or moving picture. The shutters 14, 15 and object 2 may for example operate so that each image is displayed about 25 to 30 times each second.

Figure 3:
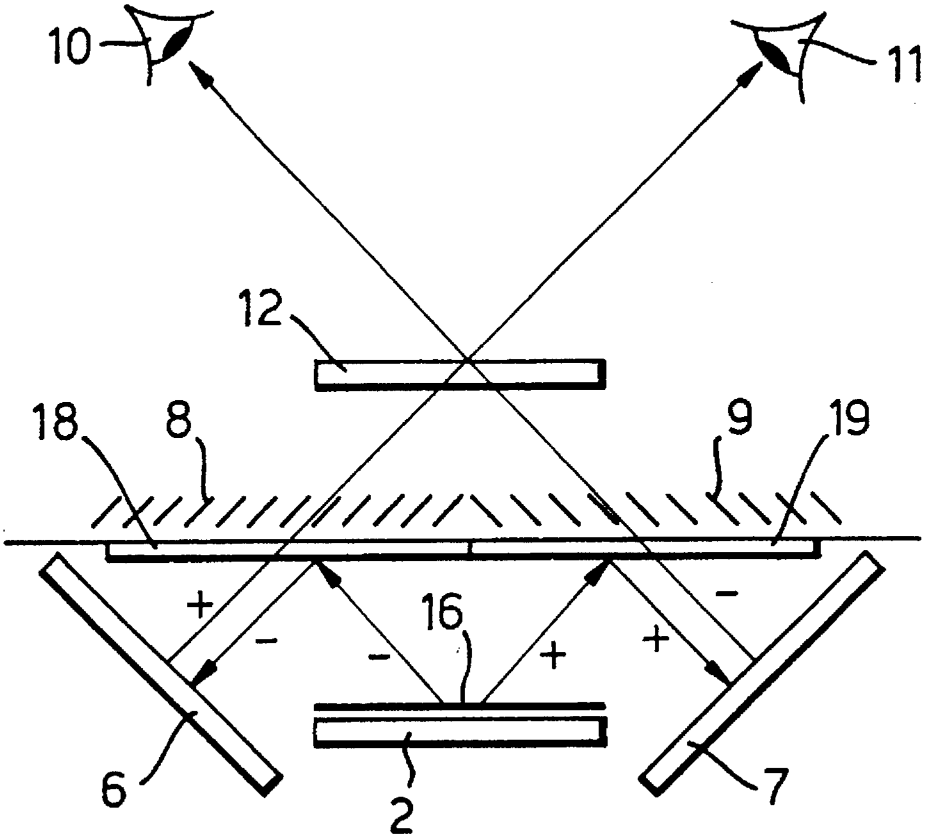

Referring to FIG. 3, the same effect can be achieved by use of a polarizing element 16 placed in front of the object 2. The polarizing element 16, such as a liquid crystal element, has two states and can be arranged to alternate therebetween such that the direction of polarization changes, for example between left and right handed circular polarization. For example, the polarizing element 16 may be a linear polarizer combined with a quarter-wave retarder. The beam splitter 4 in this embodiment is polarization selective, one part 18 reflecting light having polarisation of one direction, and the other part 19 transmitting such light, the reverse being true for light having the other direction of polarization. Thus the image can be seen by one observer when the polarizing element 16 is in one state, and by the other when the element 16 is in the other state, as indicated by arrows in the Figure.

As an alternative, the object 2 may be a display screen showing two superimposed pictures, each in a different color. If different color filters are mounted for example on the underside of the beam splitter in positions (30, 31) each corresponding to a louvre film, each observer will be able to see one of the different colored images.

Figure 4:
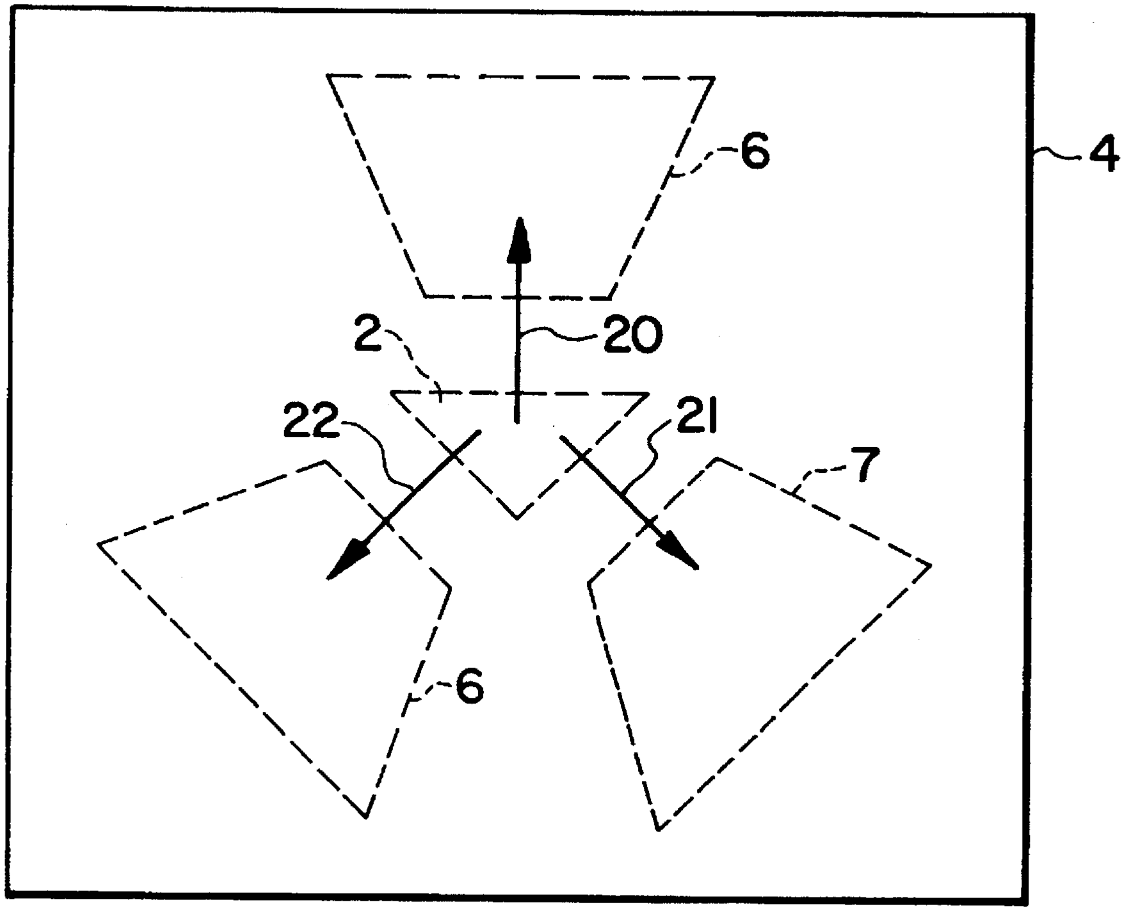
FIG. 4 is a plan view of an arrangement of retroreflector means according to one aspect of the invention.

It will be appreciated that modifications may be made to the various embodiments of the invention without departing from the scope of the invention as defined by the claims. For example if there are to be three or more observers the retroreflector means may have three or more facets arranged around the object, (as shown in FIG. 4) or may be frustroconical in shape. In this case the apparatus may for example include three or more louvre films, for example transparent plastics sheets with opaque angled slats, adjacent the beam splitter, which films may be triangular or segmental in shape.

I claim:

1. An apparatus for displaying an image of an object, comprising:

a beam splitter for receiving light from an object situated on one side thereof and reflecting at least part of that light in first and second directions, and retroreflector means for receiving the light reflected in said first and second directions and reflecting at least part of that light back to the beam-splitter to be transmitted thereby and form an image of the object on the other side of the beam splitter, characterized by screening means positioned in a path of light from the retroreflector means to the image, said screening means having first and second portions which transmit light reflected in one of the first and second directions, respectively, and which screen light reflected in the other of the first and second directions and light directly from the object.

2. An apparatus as claimed in claim 1 and including shutter means for selectively preventing the passage of light reflected in the first direction or the second direction to the image.

3. An apparatus as claimed in claim 1 and including means for selectively altering the polarization of light from the object, the beam splitter having first and second parts which reflect light in the first and second directions, respectively, the first and second parts of the beam splitter being polarization selective for light having opposite polarizations.

4. An apparatus as claimed in claim 1 and including first and second filter means for allowing the passage therethrough of light having different given spectral characteristics, the filter means each being positioned in the path of light reflected in the first and second directions, respectively, to the image.

5. An apparatus as claimed in claim 1 wherein light from the object is reflected by the beam splitter in first, second and third directions which together encompass an angle of more than 180° around the object, the retroreflector means not lying between the object and the beam splitter.

* * * * *